(12) United States Patent
Araki

(10) Patent No.: US 11,975,923 B2
(45) Date of Patent: May 7, 2024

(54) ARTICLE RETAINING DEVICE AND SUPPORTING BODY

(71) Applicant: Ishida Co., Ltd., Kyoto (JP)

(72) Inventor: Koji Araki, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 184 days.

(21) Appl. No.: 17/418,668

(22) PCT Filed: Jul. 29, 2020

(86) PCT No.: PCT/JP2020/029087
§ 371 (c)(1),
(2) Date: Jun. 25, 2021

(87) PCT Pub. No.: WO2021/059736
PCT Pub. Date: Apr. 1, 2021

(65) Prior Publication Data
US 2022/0219905 A1    Jul. 14, 2022

(30) Foreign Application Priority Data

Sep. 26, 2019  (JP) .................................. 2019-175330

(51) Int. Cl.
*B65G 3/04* (2006.01)
*G01G 19/387* (2006.01)

(52) U.S. Cl.
CPC ............. *B65G 3/04* (2013.01); *G01G 19/387* (2013.01)

(58) Field of Classification Search
CPC ...... B65G 3/04; G01G 19/387; G01G 19/393; B65B 35/02; B65B 37/00
See application file for complete search history.

(56) References Cited

U.S. PATENT DOCUMENTS

| | | | | |
|---|---|---|---|---|
| 4,497,385 A | * | 2/1985 | Sashiki | ................ G01G 19/393 |
| | | | | 177/244 |
| 4,871,038 A | * | 10/1989 | Isherwood | ........... G01G 19/393 |
| | | | | 177/25.18 |
| 2022/0219905 A1 | * | 7/2022 | Araki | ....................... B65G 3/04 |

FOREIGN PATENT DOCUMENTS

| | | |
|---|---|---|
| CN | 206645048 U | 11/2017 |
| CN | 206695891 U | 12/2017 |
| CN | 109716076 A | 5/2019 |
| JP | 2001-264153 A | 9/2001 |
| JP | 2005-024454 A | 1/2005 |
| JP | 2005024454 A * | 1/2005 |
| JP | 2010281745 A * | 12/2010 |

(Continued)

OTHER PUBLICATIONS

International Search Report issued in PCT/JP2020/029087; mailed Oct. 20, 2020.

(Continued)

*Primary Examiner* — Bob Zadeh
(74) *Attorney, Agent, or Firm* — Studebaker & Brackett PC

(57) ABSTRACT

An article retaining device includes a hopper configured to temporarily retain articles and discharge the articles, and a supporting body configured to detachably support the hopper. The hopper has a main body configured to retain the articles, and an extending portion that extends along a width direction of the main body. The supporting body has an engaging portion that engages with the extending portion, and a guide surface configured to guide movement of the extending portion to the engaging portion when the hopper is attached.

11 Claims, 11 Drawing Sheets

(56) References Cited

FOREIGN PATENT DOCUMENTS

| | | | |
|---|---|---|---|
| JP | 2013-250196 A | | 12/2013 |
| JP | 2016-099245 A | | 5/2016 |
| JP | 3221867 U | * | 6/2019 |
| JP | 3221867 U | | 6/2019 |
| WO | WO-0168493 A1 | * | 9/2001 ............. G01G 13/18 |

OTHER PUBLICATIONS

Notification of Transmittal of Translation of the International Preliminary Report on Patentability and Translation of Written Opinion of the International Searching Authority; PCT/JP2020/029087; mailed on Apr. 7, 2022.

* cited by examiner

ARTICLE RETAINING DEVICE AND SUPPORTING BODY

TECHNICAL FIELD

The present disclosure relates to an article retaining device and a supporting body.

BACKGROUND ART

Conventionally, there has been a known article retaining device including a hopper configured to temporarily retain an article and discharge the article and a supporting body configured to detachably support the hopper. For example, Patent Literature 1 describes a configuration in which a pool hopper is attached to a supporting body, which is fixed to a frame of a combination weighing machine, and supported in the combination weighing machine.

CITATION LIST

Patent Literature

Patent Literature 1: Japanese Unexamined Patent Publication No. 2013-250196

SUMMARY OF INVENTION

Technical Problem

In the article retaining device described above, it is difficult for an operator to determine a positional relationship between the hopper and the supporting body when attaching the hopper to the supporting body, and it is necessary to continue to support the relatively heavy hopper during positioning. In view of such a situation, in recent years, it is desired to improve workability when attaching the hopper to the supporting body in the article retaining device.

Therefore, an aspect of the present invention is to provide an article retaining device and a supporting body capable of improving workability of attachment of a hopper.

Solution to Problem

An article retaining device according to an aspect of the invention includes a hopper configured to temporarily retain articles and discharge the articles, and a supporting body configured to detachably support the hopper, in which the hopper has a main body configured to retain the articles, and an extending portion that extends along a width direction of the main body, the supporting body has an engaging portion that engages with the extending portion, and a guide surface configured to guide movement of the extending portion to the engaging portion when the hopper is attached.

In this article retaining device, in a case where an operator engages the extending portion of the hopper with the engaging portion of the supporting body when the hopper is attached to the supporting body, movement of the extending portion can be guided by the guide surface of the supporting body. Therefore, the hopper can be easily attached to the supporting body, and workability of attaching the hopper can be improved.

In an embodiment, in a case where a direction in which the hopper moves when the hopper is attached to the supporting body and which extends along a horizontal direction is set to an attaching direction, the guide surface may have a region inclined to rise in the attaching direction. In this case, when the hopper is attached to the supporting body, at least a part of the weight of the hopper can be supported by the guide surface by placing the extending portion on the guide surface. Then, in this state, when the hopper is pushed in the attaching direction, movement of the extending portion can be guided by sliding the extending portion to raise the guide surface.

In the embodiment, an inclination angle of an inclined region on the guide surface may be 45° or less. In this way it is possible to effectively exert the above-mentioned effects by the guide surface inclined to rise in the attaching direction.

In the embodiment, the guide surface may have a region along a horizontal plane. In this case, when the hopper is attached to the supporting body, by placing the extending portion on the guide surface, at least a part of the weight of the hopper can be effectively supported by the guide surface.

In the embodiment, the engaging portion may be a groove provided at a position lower than the guide surface to accommodate the extending portion. In this case, when the hopper is attached to the supporting body, the extending portion and the engaging portion can be engaged with each other by dropping hopper so that the extending portion on the guide surface falls into the engaging portion.

In the embodiment, in a case where a direction in which the hopper moves when the hopper is attached to the supporting body and which extends along a horizontal direction is set to an attaching direction, the groove as the engaging portion may be provided to be continuous with an end side of the guide surface in the attaching direction when viewed from a horizontal direction orthogonal to the attaching direction. In this case, when the hopper is attached to the supporting body, by pushing the hopper in the attaching direction, the hopper can be dropped so that the extending portion on the guide surface falls into the engaging portion.

In the embodiment, in a case where a direction in which the hopper moves when the hopper is attached to the supporting body and which extends along a horizontal direction is set to an attaching direction, the supporting body may have a contact surface provided on a side in a direction opposite to the attaching direction with respect to the guide surface and capable of coming into contact with the extending portion when the hopper is attached. In this way, when the hopper is attached to the supporting body, a position of the extending portion and a position of the hopper can be regulated by bringing the extending portion into contact with the contact surface.

In the embodiment, when viewed from a horizontal direction orthogonal to the attaching direction, the contact surface may be provided to be continuous with an end side of the guide surface in the direction opposite to the attaching direction and extend downward from the end side. In this way, when the hopper is attached to the supporting body, even in a case where the extending portion comes into contact with the contact surface, the extending portion can be smoothly brought onto the guide surface by appropriately shifting the hopper.

In the embodiment, an angle at which the guide surface and the contact surface intersect may be 90° or more and less than 180°. In this way, the above-mentioned action of the guide surface and the contact surface can be effectively exerted.

In the embodiment, the supporting body may have a pair of vertical walls arranged to face each other in a width direction of the main body, the guide surface may be provided to bridge the pair of vertical walls, and the contact surface may be provided to close between the pair of vertical walls. In this way, when the hopper is attached to the supporting body, it is possible to inhibit a part of the hopper from entering between the pair of vertical walls of the supporting body.

In the embodiment, the hopper may have a gate provided at a bottom thereof and allowed to be opened and closed, and in a case where a direction in which the hopper moves when the hopper is attached to the supporting body and which extends along a horizontal direction is set to an attaching direction, the guide surface may be provided to be separated from the gate in an open state in a direction along the attaching direction. In this way, it is possible to prevent the presence of the guide surface from adversely effecting opening and closing of the gate of the hopper.

A supporting body according to an aspect of the invention is a supporting body for detachably supporting a hopper having a main body for retaining articles, and an extending portion that extends along a width direction of the main body, and includes an engaging portion that engages with the extending portion of the hopper, and a guide surface configured to guide movement of the extending portion to the engaging portion when the hopper is attached.

Even in this supporting body, in a case where the extending portion of the hopper is engaged with the engaging portion when the hopper is attached, movement of the extending portion can be guided by the guide surface. Therefore, the hopper can be easily attached to the supporting body, and workability of attaching the hopper can be improved.

Advantageous Effects of Invention

According to an aspect of the invention, it is possible to provide an article retaining device and a supporting body capable of improving workability of attachment of a hopper.

DESCRIPTION OF EMBODIMENTS

Hereinafter, an embodiment will be described in detail with reference to the drawings. In each figure, the same or corresponding parts are given the same reference symbols, and duplicate description will be omitted. The words "upper" and "lower" correspond to a vertical direction in a perpendicular direction.

[Configuration of Combination Weighing Apparatus]

Figure 1:
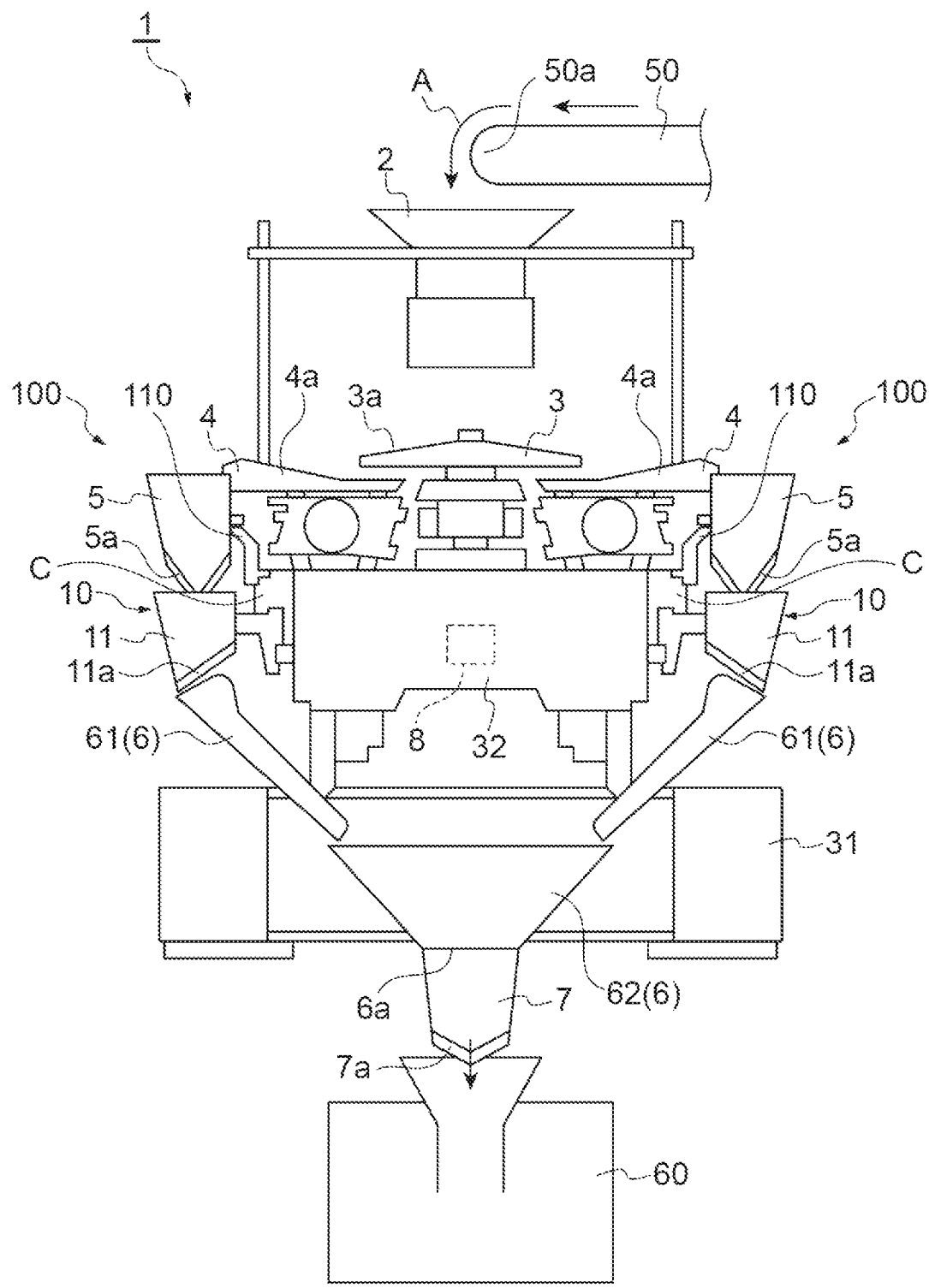
FIG. 1 is a configuration diagram illustrating a combination weighing apparatus including an article retaining device according to an embodiment.

As illustrated in FIG. 1, a combination weighing apparatus 1 includes a charge chute 2, a dispersion feeder 3, a plurality of radiation feeders 4, a plurality of pool hoppers (hoppers) 5, a plurality of weighing devices 10, each of which has a weighing hopper 11, a collecting chute 6, a timing hopper 7, and a control unit 8. The combination weighing apparatus 1 weighs articles A (articles having variations in unit mass such as agricultural products, marine products, and processed foods) supplied by a conveyance conveyor 50 so that a target weighing value is obtained and supplies the articles A to a bag making/packaging machine 60. Note that the bag making/packaging machine 60 is a device that packages the articles A weighed and supplied by the combination weighing apparatus 1 while molding a film into a bag of a predetermined capacity.

The charge chute 2 is arranged below a conveying end 50a of the conveyance conveyor 50. The charge chute 2 receives the articles A conveyed by the conveyance conveyor 50 from the outside and dropped from the conveying end 50a of the conveyance conveyor 50, and discharges the articles A downward.

The dispersion feeder 3 is arranged below the charge chute 2. The dispersion feeder 3 has a conical conveying surface 3a that widens downward toward an end. The dispersion feeder 3 uniformly conveys the articles A discharged from the charge chute 2 to a top of the conveying surface 3a toward an outer edge of the conveying surface 3a by vibrating the conveying surface 3a.

The plurality of radiation feeders 4 is radially arranged along the outer edge of the conveying surface 3a of the dispersion feeder 3. Each of the radiation feeders 4 has a trough 4a extending outward from below the outer edge of the conveying surface 3a. Each radiation feeder 4 conveys the articles A discharged from the outer edge of the conveying surface 3a toward a distal end of the trough 4a by vibrating the trough 4a.

The plurality of pool hoppers 5 is arranged in an annular shape so that each of the pool hoppers 5 is arranged below the distal end of the trough 4a of each radiation feeder 4. Each pool hopper 5 has a gate 5a allowed to be opened and closed with respect to a bottom thereof. Each pool hopper 5 temporarily stores the articles A discharged from the distal end of the corresponding trough 4a by closing the gate 5a. Each pool hopper 5 discharges the temporarily stored articles A downward by opening the gate 5a.

The plurality of weighing hoppers 11 is arranged in an annular shape so that each of the weighing hoppers 11 is arranged below the gate 5a of each pool hopper 5. Each weighing hopper 11 has a gate 11a allowed to be opened and closed with respect to a bottom thereof. Each weighing hopper 11 temporarily stores the articles A discharged from the corresponding pool hopper 5 by closing the gate 11a. Each weighing hopper 11 discharges the temporarily stored articles A downward by opening the gate 11a. When the weighing hopper 11 of each weighing device 10 temporarily stores the articles A, each weighing device 10 obtains a weighing value according to the mass of the articles A.

The collecting chute 6 has a plurality of upper chute portions 61 and a lower chute portion 62. The plurality of upper chute portions 61 is arranged in an annular shape so that an upper end of each upper chute portion 61 is located below the gate 11a of each weighing hopper 11 and a lower end of each upper chute portion 61 is gathered in a central portion. Each upper chute portion 61 receives the articles A discharged from each weighing hopper 11 and slides the articles A toward the central portion. The lower chute portion 62 is arranged below the lower end of each upper chute portion 61. The lower chute portion 62 discharges the articles A discharged from each upper chute portion 61 downward from a discharge port 6a.

The timing hopper 7 is arranged below the discharge port 6a of the collecting chute 6. The timing hopper 7 has a gate 7a allowed to be opened and closed with respect to a bottom thereof. The timing hopper 7 temporarily stores the articles A discharged from the collecting chute 6 by closing the gate 7a, and discharges the temporarily stored articles A to the bag making/packaging machine 60 by opening the gate 7a.

The control unit 8 is arranged in a case 32 supported by a frame 31. The control unit 8 has a CPU, a ROM, a RAM, etc. The control unit 8 controls operations of respective portions of the combination weighing apparatus 1 such as a conveying operation of the dispersion feeder 3 and the radiating feeder 4, an opening and closing operation of the gate 5a of each pool hopper 5, an opening and closing operation of the gate 11a of each weighing hopper 11, and an opening and closing operation of the gate 7a of the timing hopper 7. The control unit 8 selects a combination of weighing values so that a total value becomes a target weighing value (specifically, the total value falls within a predetermined range having the target weighing value as a lower limit) based on a weighing value of the articles A output from each weighing device 10 (that is, a weighing value of the articles A temporarily stored in the weighing hopper 11 of each weighing device 10), and discharges the articles A from a weighing hopper 11 corresponding to the combination.

In the combination weighing apparatus 1, the charge chute 2, the dispersion feeder 3, the plurality of radiation feeders 4, the plurality of pool hoppers 5, and the plurality of weighing devices 10 are directly or indirectly supported by the case 32. The collecting chute 6 and the timing hopper 7 are directly or indirectly supported by the frame 31. The combination weighing apparatus 1 includes a plurality of article retaining devices 100.

[Configuration of Article Retaining Device]

Next, the article retaining device 100 will be described. FIG. 2 and FIGS. 5 to 9 illustrate a part of the pool hopper 5 (attachment portion 52) in cross section.

Figure 2:
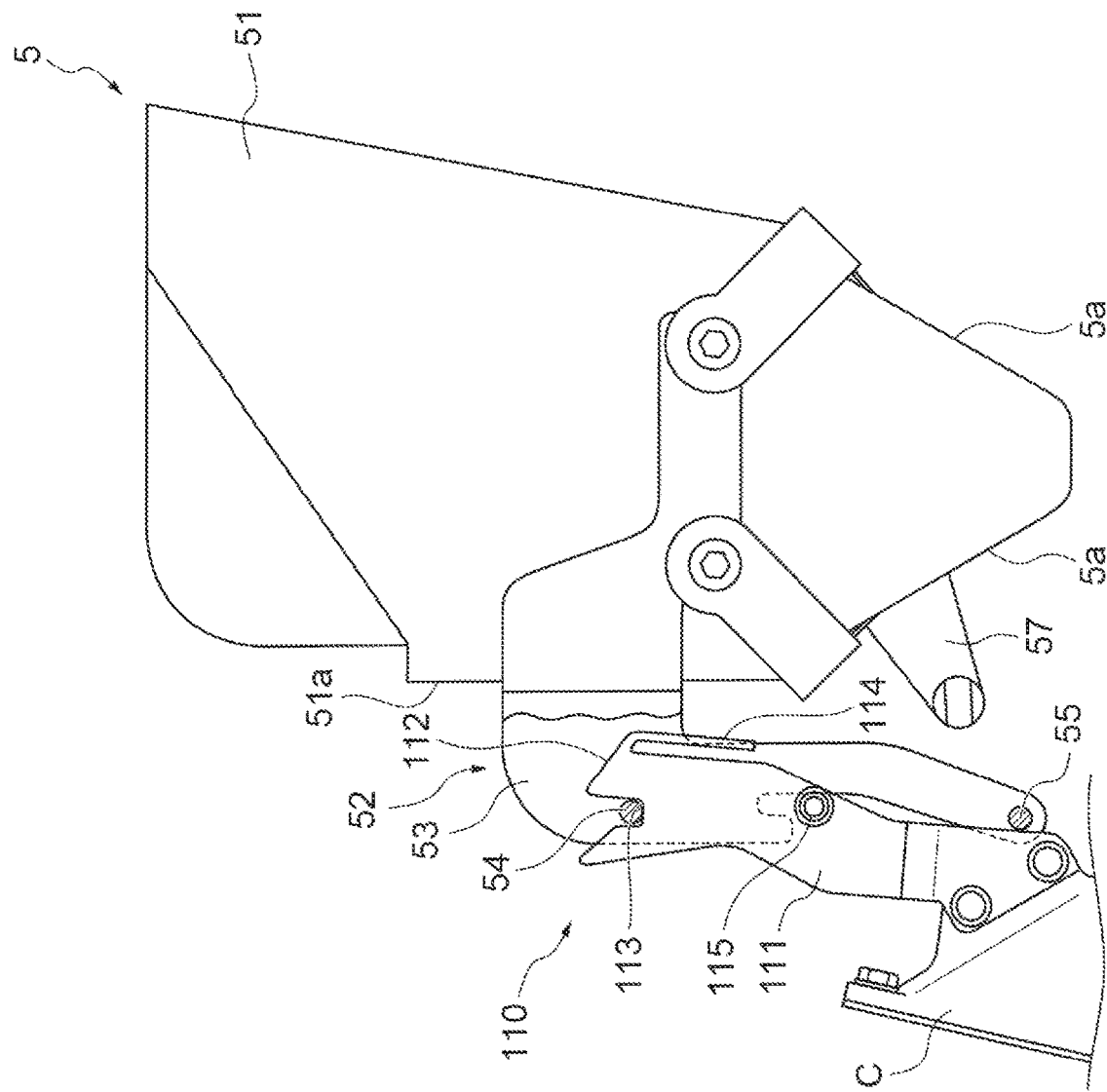
FIG. 2 is a side view illustrating the article retaining device of FIG. 1.
Figure 4:
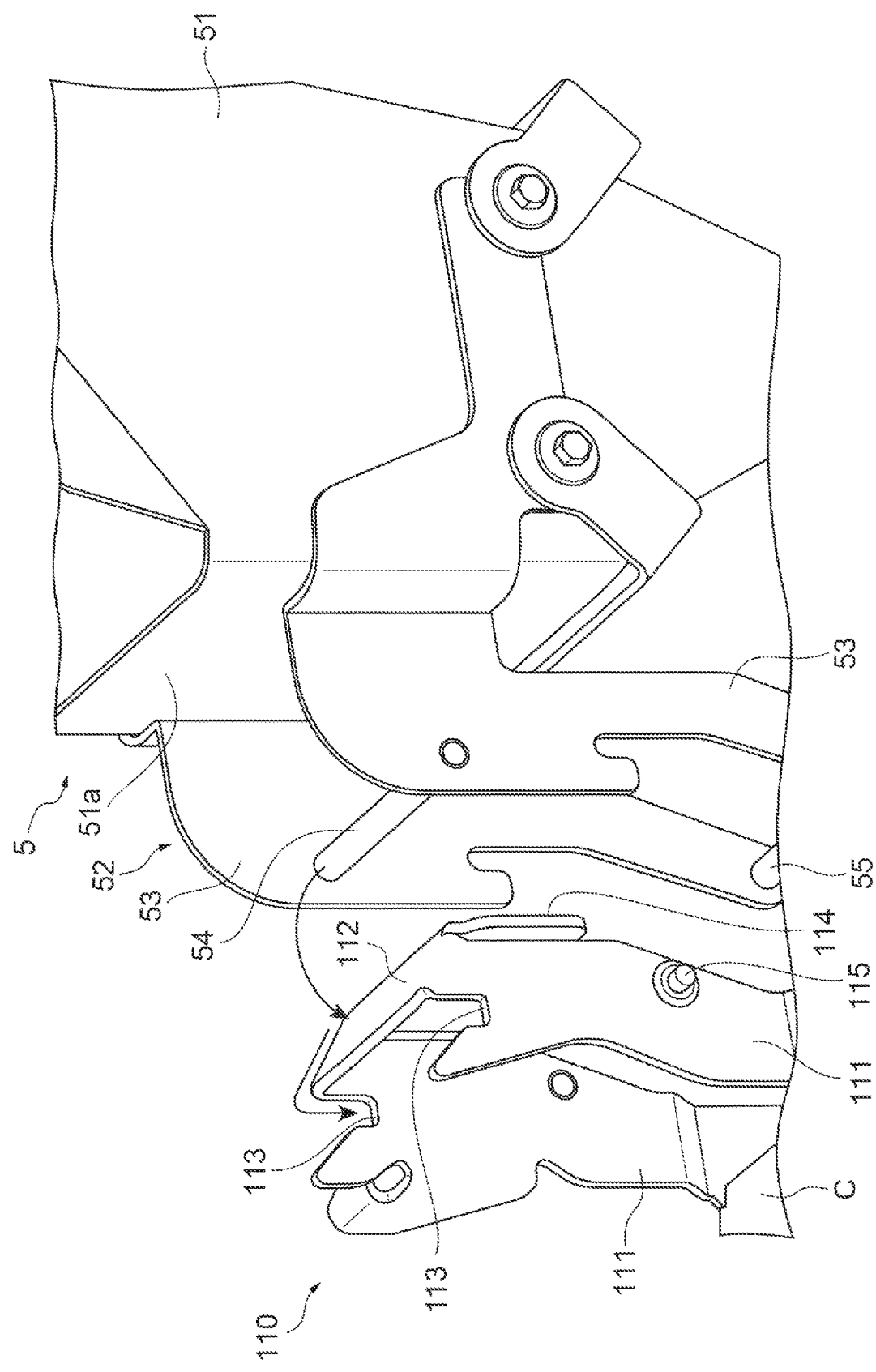
FIG. 4 is a perspective view for description of a case where a hopper is attached to the supporting body in the article retaining device of FIG. 2.

Each of the article retaining devices 100 includes the pool hopper 5 and a supporting body 110. As illustrated in FIGS. 2 and 4, the pool hopper 5 has a main body 51, an attachment portion 52, and the gate 5a. The main body 51 has a cup shape that opens upward. The main body 51 is a part where the articles A are retained inside. The attachment portion 52 is a part for attaching the main body 51 to the supporting body 110. The attachment portion 52 includes a pair of hopper vertical walls 53, a first shaft body 54, and a second shaft body 55.

The pair of hopper vertical walls 53 is provided on a side of an attaching direction behind the main body 51 (hereinafter, also simply referred to as "attaching direction"). The attaching direction is a direction in which the pool hopper 5 moves with respect to the supporting body 110 when the pool hopper 5 is attached to the supporting body 110, and is a direction along a horizontal direction. The attaching direction is a radial inside of an annular shape of the plurality of pool hoppers 5 arranged in the annular shape. The pair of hopper vertical walls 53 has a plate shape whose thickness direction is a width direction. The pair of hopper vertical walls 53 is arranged to face each other in the width direction. The pair of hopper vertical walls 53 is fixed to the main body 51. The pair of hopper vertical walls 53 extends from an outer wall 51a on the attaching direction side of the main body 51 so as to bend downward.

The first shaft body 54 is a member extending in a width direction of the main body 51 (see FIG. 4, hereinafter, also simply referred to as "width direction"). The first shaft body 54 is included in an extending portion. The first shaft body 54 is provided between the pair of hopper vertical walls 53. The first shaft body 54 is orthogonal to the pair of hopper vertical walls 53. The first shaft body 54 is a round shaft. The first shaft body 54 is provided above the second shaft body 55. The first shaft body 54 has a function of engaging with an engaging portion 113, which will be described later, and a function of increasing the rigidity of the attachment portion 52.

The second shaft body 55 is a member extending in the width direction. The second shaft body 55 is provided between the pair of hopper vertical walls 53. The second shaft body 55 is orthogonal to the pair of hopper vertical walls 53. The second shaft body 55 is a round shaft. The second shaft body 55 is provided below the first shaft body 54 and at lower ends of the pair of hopper vertical walls 53. The second shaft body 55 has a function of increasing the rigidity of the attachment portion 52.

The gate 5a is provided at a bottom of the main body 51 such that the gate 5a can be opened and closed. By closing the gate 5a, the articles A can be retained in the main body 51, while by opening the gate 5a, the articles A can be dropped (discharged) to the outside. The gate 5a is connected to a drive unit (not illustrated) for opening and closing the gate 5a via a link 57.

Figure 3:
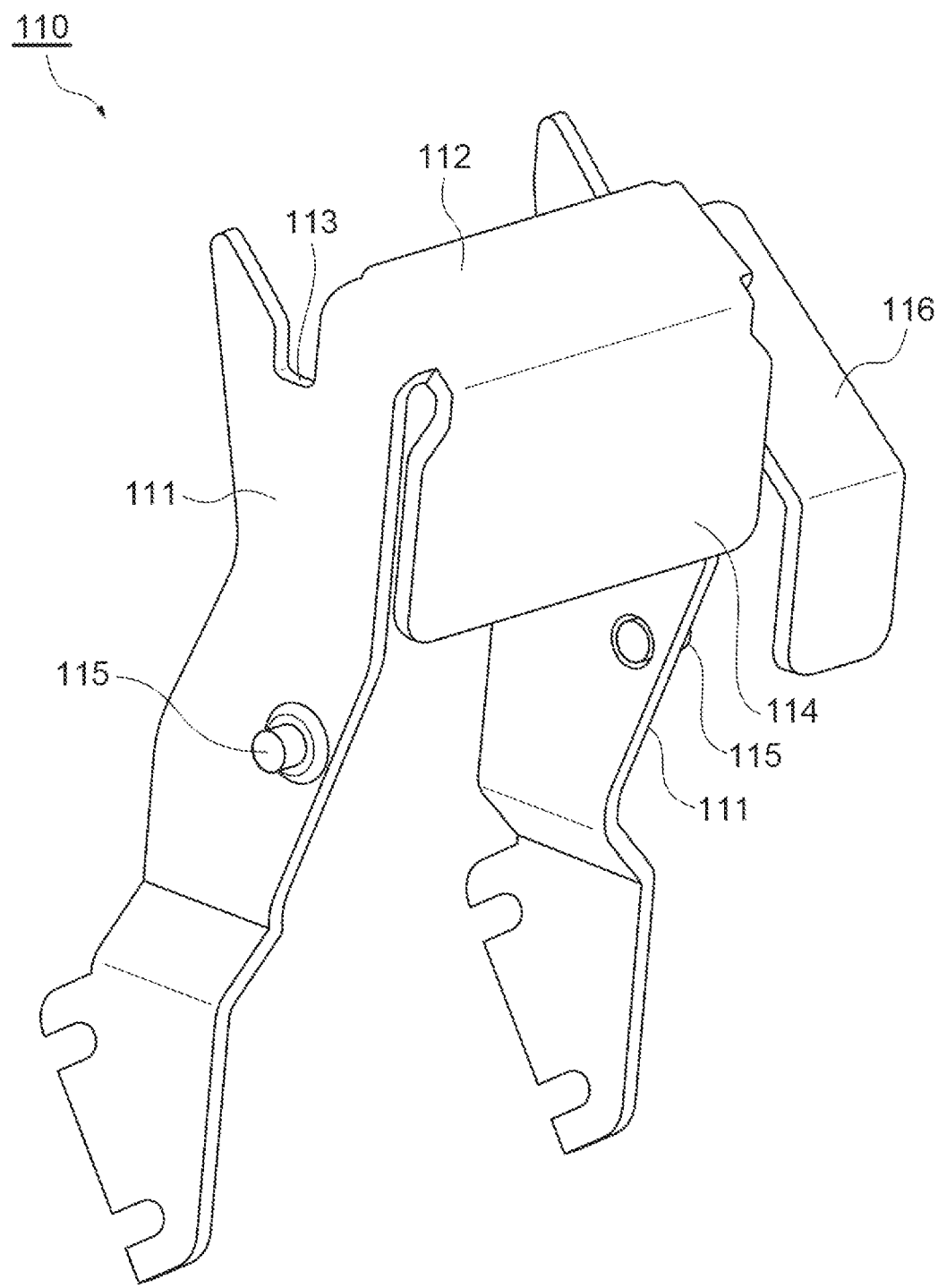
FIG. 3 is a perspective view illustrating a supporting body of FIG. 2.

As illustrated in FIGS. 2 and 3, the supporting body 110 detachably supports the pool hopper 5. The supporting body 110 is a plate-shaped structure (sheet metal processed product) formed by molding into a desired shape. The supporting body 110 has a pair of supporting body vertical walls (vertical walls) 111, a guide surface 112, an engaging portion 113, a contact surface 114, a positioning convex portion 115, and a cover surface 116.

The pair of supporting body vertical walls 111 is arranged to face each other in the width direction. Lower end sides of the pair of supporting body vertical walls 111 are fixed to a cover C of the case 32 (see FIG. 1) by, for example, a bolt, etc. The pair of supporting body vertical walls 111 has a plate shape whose thickness direction is a width direction.

The guide surface 112 is a surface that guides movement of the first shaft body 54 to the engaging portion 113 when the pool hopper 5 is attached. The guide surface 112 is provided to bridge upper ends of the pair of supporting body vertical walls 111. The guide surface 112 includes an upper surface of an upper wall continuous with the upper ends of the pair of supporting body vertical walls W. The guide surface 112 is inclined to rise in the attaching direction. An inclination angle (angle formed with a horizontal plane) of the guide surface 112 is 45° or less. For example, the guide surface 112 is a gentle slope having an inclination angle of 40°. The guide surface 112 is a flat surface. The guide surface 112 is provided to be separated from the gate 5a of the pool hopper 5 in an open state in a direction along the attaching direction in a state where the pool hopper 5 is attached to and supported by the supporting body 110 (see FIG. 9).

The engaging portion 113 engages with the first shaft body 54. The engaging portion 113 is provided in an upper part of the supporting body vertical wall 111. The engaging portion 113 is a groove that accommodates the first shaft body 54. The engaging portion 113 is a U-shaped notch (U-shaped groove) that opens upward. The engaging portion 113 is provided at a position lower than the guide surface 112. The engaging portion 113 is provided on the attaching direction side (back side) of the guide surface 112. Specifically, the engaging portion 113 is provided to be continuous with an end side of the guide surface 112 in the attaching direction when viewed from the width direction which is the horizontal direction orthogonal to the attaching direction.

The contact surface 114 is a surface capable of coming into contact with the first shaft body 54 of the pool hopper 5 when the pool hopper 5 is attached. The contact surface 114 is provided on a side in a direction opposite to the attaching direction of the pool hopper 5 with respect to the guide surface 112. The contact surface 114 is provided to close between the pair of supporting body vertical walls 111. A widthwise dimension of the contact surface 114 is greater than a dimension between the pair of supporting body vertical walls 111 and smaller than a dimension between the pair of hopper vertical walls 53.

The contact surface 114 is provided to be continuous with the end side of the guide surface 112 in a direction opposite to the attaching direction. The contact surface 114 extends downward from the end side of the guide surface 112 in the direction opposite to the attaching direction. The contact surface 114 includes a front surface of a front wall hanging down in front of an upper wall (in the direction opposite to the attaching direction) included in the guide surface 112. An angle at which the guide surface 112 and the contact surface 114 intersect is 90° or more and less than 180°. For example, the angle at which the guide surface 112 and the contact surface 114 intersect is 130°. The contact surface 114 is a vertical surface perpendicular to the attaching direction. The contact surface 114 is a flat surface.

The positioning convex portion 115 is provided at a central portion of each of the pair of supporting body vertical walls 111 in the vertical direction. The positioning convex portion 115 is provided to project outward in the width direction. The positioning convex portion 115 has a cylindrical shape whose axial direction is the width direction. The positioning convex portion 115 abuts between the first shaft body 54 and the second shaft body 55 on the hopper vertical wall 53 of the pool hopper 5 to position (set a posture of) the pool hopper 5.

The cover surface 116 has a function of guiding engagement of the link 57 with a drive unit (not illustrated) that opens and closes the gate 5a when the pool hopper 5 is attached to the supporting body 110. The cover surface 116 includes a vertical surface orthogonal to the attaching direction, and an inclined surface provided to be continuous with an upper piece of the vertical surface and inclined to rise with respect to the horizontal plane toward the attaching direction. The cover surface 116 is connected to one of the supporting body vertical walls 111. The cover surface 116 is arranged apart from the pair of supporting body vertical walls 111 on the outer side in the width direction. The hopper vertical walls 53 are inserted between one of the supporting body vertical walls 111 and the cover surface 116.

[Action and Effect]

Figure 5:
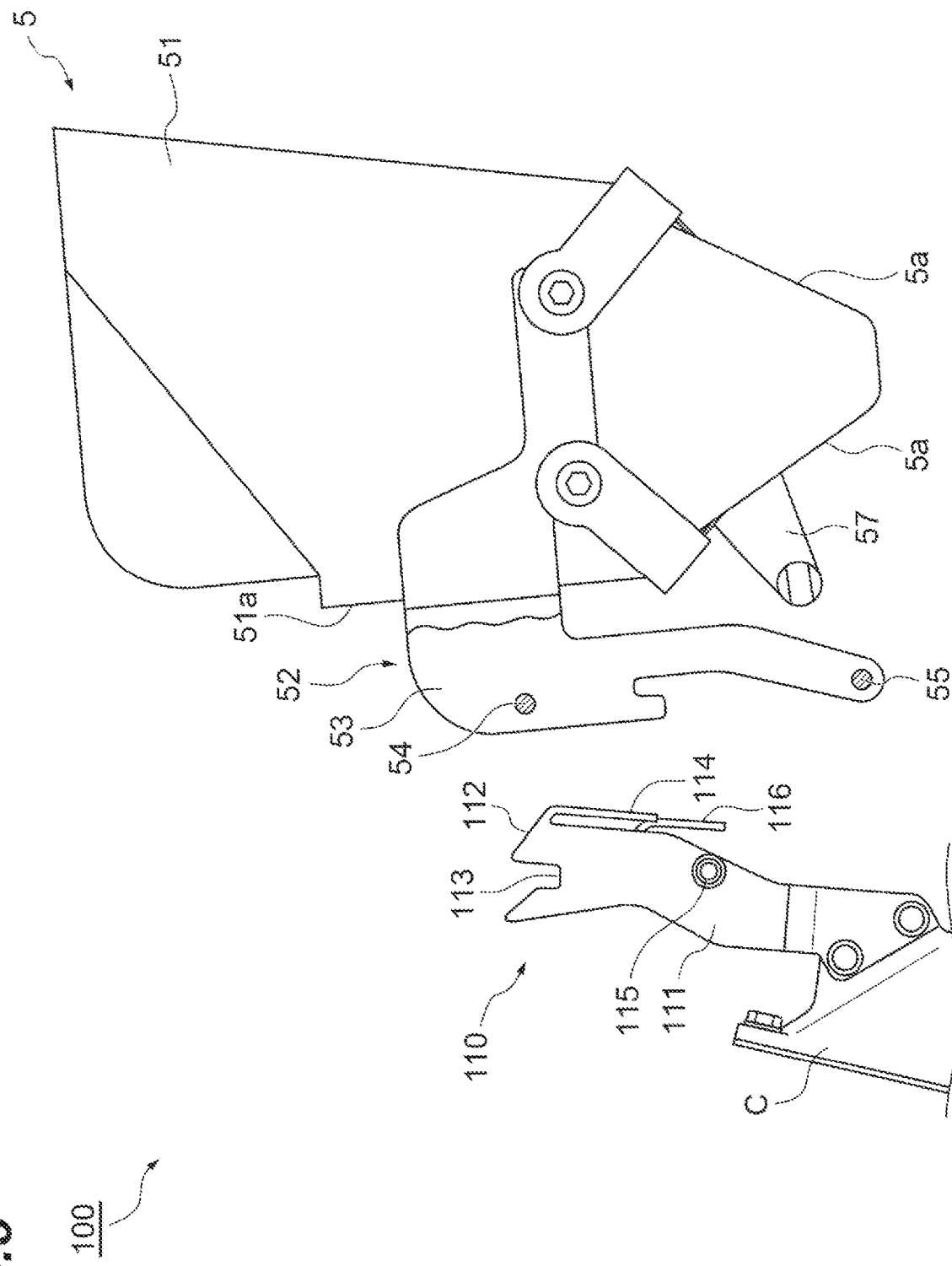
FIG. 5 is a side view for description of a case where the hopper is attached to the supporting body in the article retaining device of FIG. 2.
Figure 6:
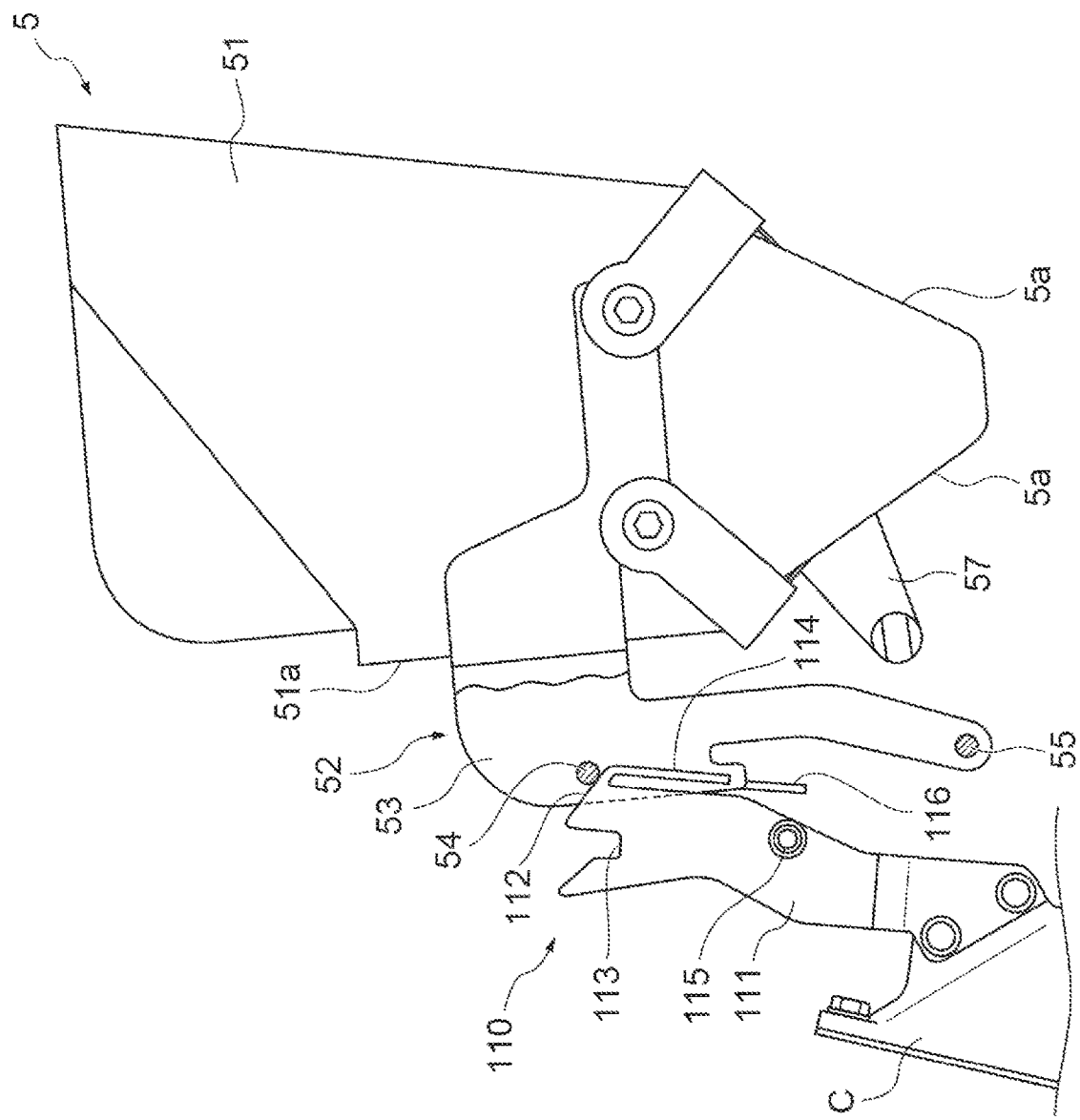
FIG. 6 is a side view for description of a continuation of FIG. 5.
Figure 7:
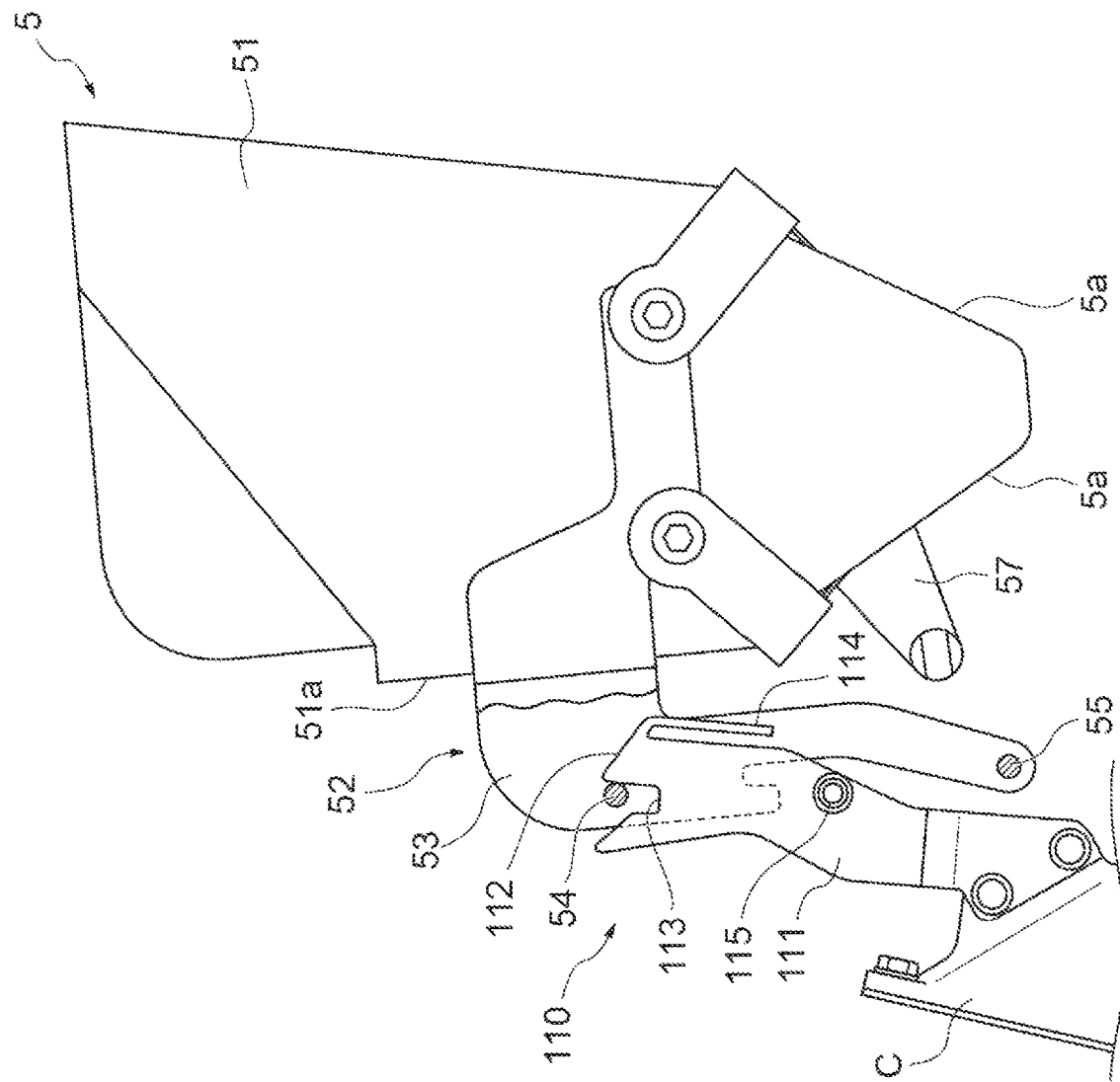
FIG. 7 is a side view for description of a continuation of FIG. 6.

As illustrated in FIGS. 5, 6, and 7, when the pool hopper 5 is detachably attached to the supporting body 110, first, the operator positions the pool hopper 5 so that the pair of supporting body vertical walls 111 of the supporting body 110 is arranged between the pair of hopper vertical walls 53 of the pool hopper 5. This positioning may be realized, for example, by appropriately shifting the pool hopper 5 in the width direction while bringing the first shaft body 54 of the pool hopper 5 into contact with the contact surface 114 of the supporting body 110. At the same time, by placing the first shaft body 54 of the pool hopper 5 on the guide surface 112 of the supporting body 110, the weight of the pool hopper 5 is borne by the supporting body 110.

Figure 8:
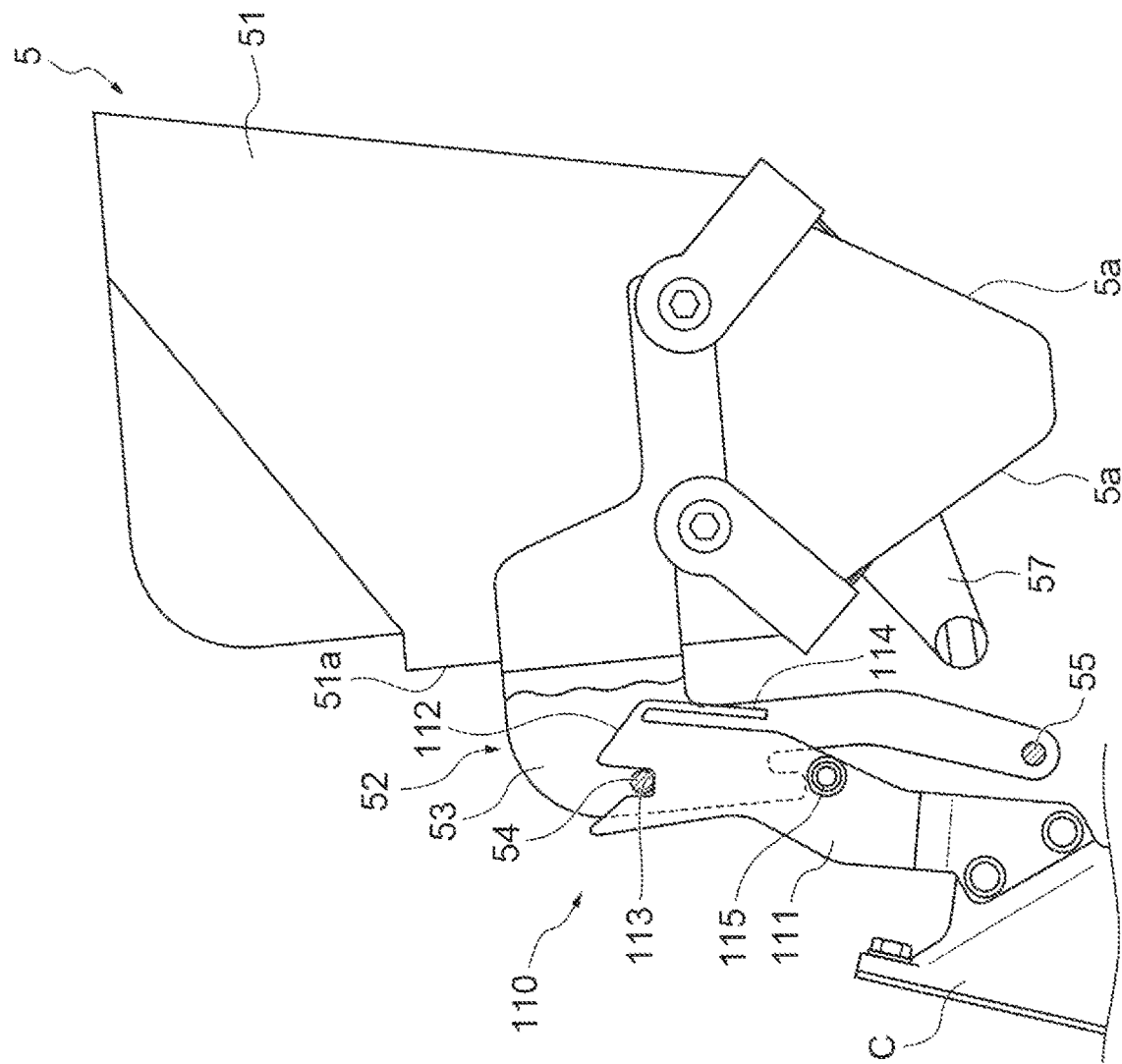
FIG. 8 is a side view for description of a continuation of FIG. 7.
Figure 9:
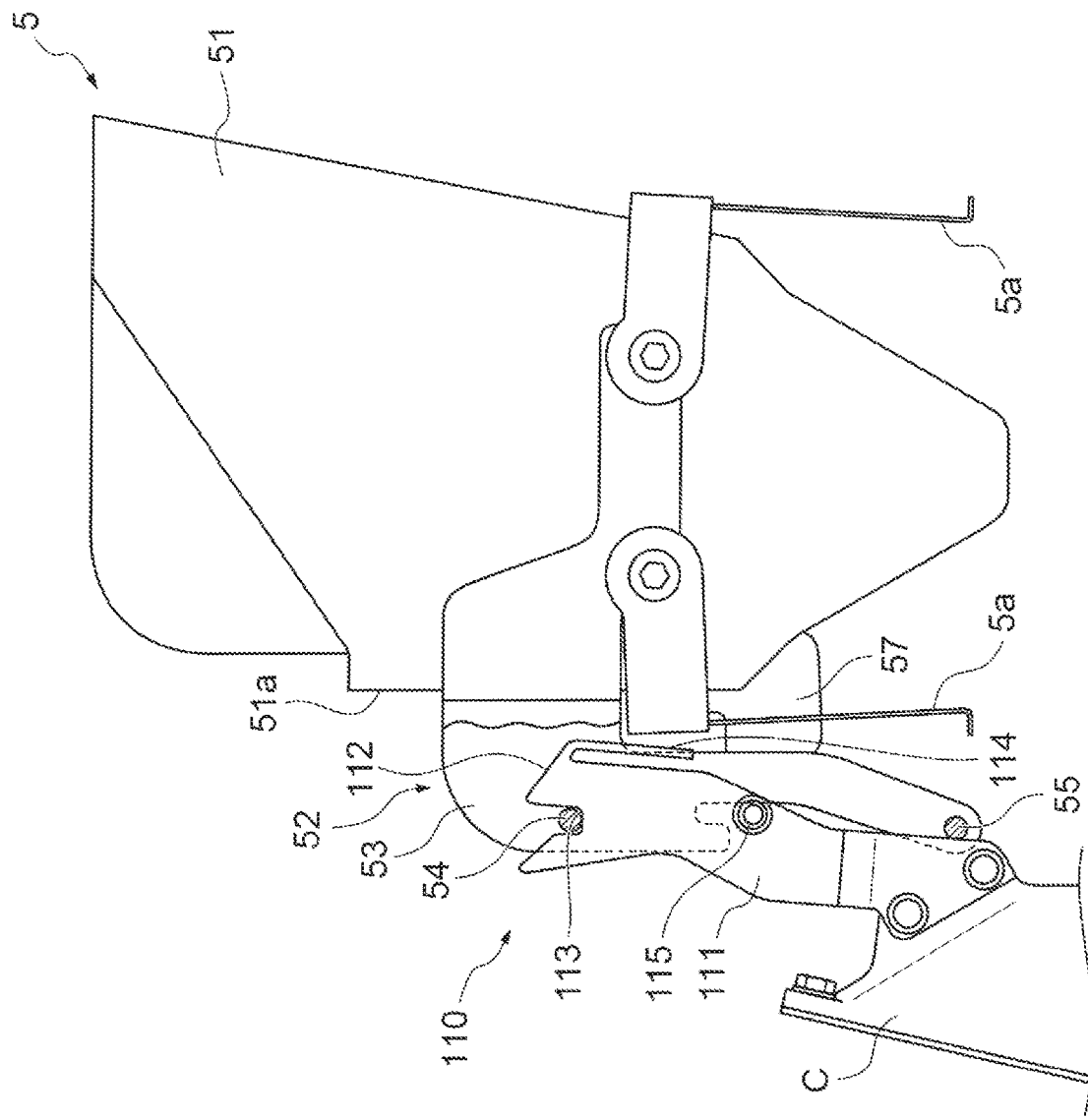
FIG. 9 is a side view illustrating a state in which a gate of the hopper is open in the article retaining device of FIG. 2.

In this state, by pressing the pool hopper 5 toward the back side (attaching direction side), the first shaft body 54 is slid to raise the guide surface 112. In this way, the pool hopper 5 moves backward and upward along the guide surface 112. As illustrated in FIG. 8, at the end of sliding of the first shaft body 54, the first shaft body 54 falls into the engaging portion 113 from the back side of the guide surface 112, and the first shaft body 54 is engaged with the engaging portion 113. Then, as illustrated in FIG. 2, the positioning convex portion 115 of the supporting body 110 is brought into contact with the pair of hopper vertical walls 53 of the pool hopper 5 to position the pool hopper 5 at a predetermined position. As described above, attachment of the pool hopper 5 to the supporting body 110 is completed.

As described above, in the article retaining device 100, in a case where the operator engages the first shaft body 54 of the pool hopper 5 with the engaging portion 113 of the supporting body 110 when the pool hopper 5 is attached to the supporting body 110, movement of the first shaft body 54 can be guided by the guide surface 112 of the supporting body 110. In this way, the pool hopper 5 can be easily attached to the supporting body 110, and workability of attaching the pool hopper 5 can be improved. It is possible to enhance convenience at the time of attaching the pool hopper 5. An allowable range in the vertical direction and the width direction at the time of attaching the pool hopper 5 is widened, and the pool hopper 5 can be sensuously attached. In addition, a burden of supporting the weight of the pool hopper 5 during positioning is reduced. Attachment of the pool hopper 5 can be simplified.

When the pool hopper 5 is attached, the attachment portion 52 is located on the back side of the pool hopper 5, and from the operator standing on the front side, a position of the first shaft body 54 of the attachment portion 52, a position of the engaging portion 113 of the supporting body 110, etc. are hidden behind the pool hopper 5 and cannot be seen. For this reason, the operator needs to fumble to attach the pool hopper 5 while shifting the pool hopper 5 in the vertical direction and the width direction. In this regard, the effect of improving the workability of attaching the pool hopper 5 is remarkable.

In the article retaining device 100, the guide surface 112 is inclined to rise in the attaching direction. In this way, when the pool hopper 5 is attached to the supporting body 110, at least a part of the weight of the pool hopper 5 can be supported by the guide surface 112 by placing the first shaft body 54 on the guide surface 112. Then, in this state, when the pool hopper 5 is pushed in the attaching direction, movement of the first shaft body 54 can be guided by sliding the first shaft body 54 to raise the guide surface 112.

Note that when the pool hopper 5 is attached to the supporting body 110, a height at which the pool hopper 5 can be positioned is limited due to a relationship with a part or a mechanism on an upstream side of the pool hopper 5. When the guide surface 112 is inclined in this way, the pool hopper 5 can be easily attached without being positioned at a high position. Further, the presence of the guide surface 112 widens an allowable range of a vertical positional deviation of the first shaft body 54.

In the article retaining device 100, the inclination angle of the guide surface 112 is 45° or less. In this way, it is possible to effectively exert the above-mentioned action by the guide surface 112 inclined to rise in the attaching direction.

In the article retaining device 100, the engaging portion 113 is a groove provided at a position lower than the guide surface 112 to accommodate the first shaft body 54. In this case, when the pool hopper 5 is attached to the supporting body 110, the first shaft body 54 and the engaging portion 113 can be engaged with each other by dropping the pool hopper 5 from the guide surface 112 so that the first shaft body 54 on the guide surface 112 falls into the engaging portion 113.

In the article retaining device 100, the groove as the engaging portion 113 is provided to be continuous with the end side of the guide surface 112 in the attaching direction when viewed from the width direction. In this way, when the pool hopper 5 is attached to the supporting body 110, by pushing the pool hopper 5 in the attaching direction, the pool hopper 5 can be dropped so that the first shaft body 54 on the guide surface 112 falls into the engaging portion 113.

In the article retaining device 100, the supporting body 110 has the contact surface 114. In this way when the pool hopper 5 is attached to the supporting body 110, the position of the first shaft body 54 and the position of the pool hopper 5 can be regulated by bringing the first shaft body 54 into contact with the contact surface 114. Further, for example, the pool hopper 5 can be positioned in the width direction by appropriately shifting the pool hopper 5 in the width direction while bringing the first shaft body 54 into contact with the contact surface 114.

In the article retaining device 100, when viewed from the width direction, the contact surface 114 is provided to be continuous with the end side of the guide surface 112 on the front side, and extends downward from the end side. In this way, when the pool hopper 5 is attached to the supporting body 110, even in a case where the first shaft body 54 comes into contact with the contact surface 114, the first shaft body 54 can be smoothly brought onto the guide surface 112 by appropriately shifting the pool hopper 5 upward.

In the article retaining device 100, the angle at which the guide surface 112 and the contact surface 114 intersect is 90° or more and less than 180°. In this way, it is possible to effectively exert the above-mentioned effects of the guide surface 112 and the contact surface 114.

In the article retaining device 100, the contact surface 114 is provided to close between the pair of supporting body vertical walls 111. In this way, when the pool hopper 5 is attached to the supporting body 110, it is possible to inhibit a part of the pool hopper 5 (hopper vertical wall 53) from entering between the pair of supporting body vertical walls 111 of the supporting body 110.

In the article retaining device 100, the pool hopper 5 has the gate 5a. The guide surface 112 is provided to be separated from the gate 5a in the open state in the direction along the attaching direction. In this way, it is possible to prevent the presence of the guide surface 112 from adversely affecting opening and closing of the gate 5a of the pool hopper 5.

Even in the supporting body 110, when the pool hopper 5 is attached, movement of the first shaft body 54 can be guided by the guide surface 112. Therefore, the pool hopper 5 can be easily attached to the supporting body 110, and the above-mentioned effects such as improving workability of attaching the pool hopper 5 can be obtained.

[Modification]

Figure 10:
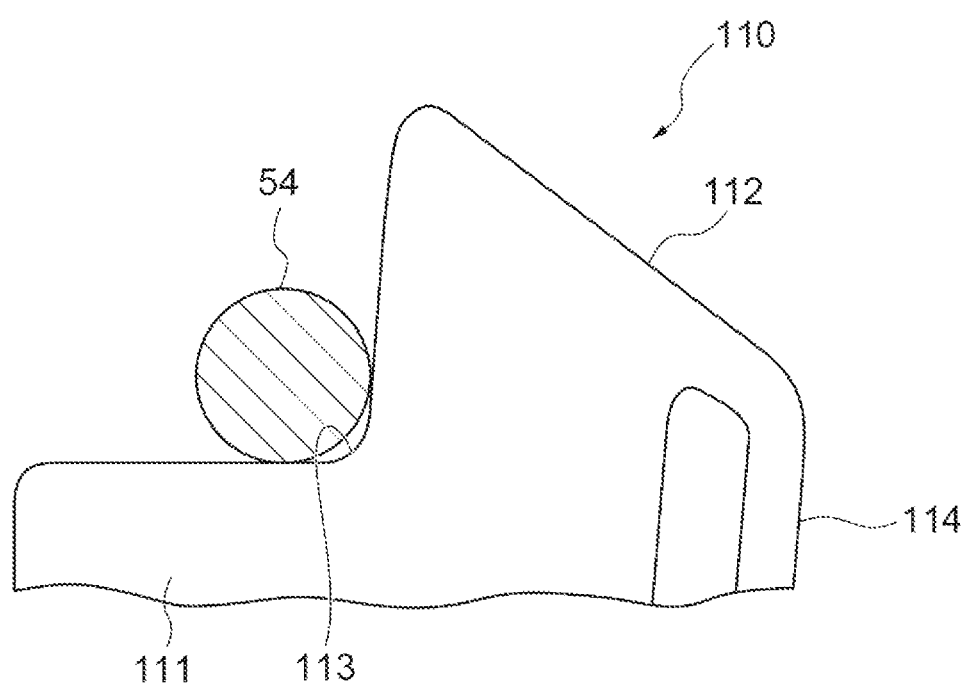
FIG. 10 is a side view illustrating an engaging portion according to a modification.

In the embodiment, the engaging portion 113 is formed of a U-shaped groove. However, a mode of the engaging portion 113 is not particularly limited. For example, as illustrated in FIG. 10, the engaging portion 113 may include a corner portion having two side edges (two sides) when viewed from the width direction. In this case, the first shall body 54 is engaged to be in contact with the two sides of the corner portion.

In the embodiment, the entire region of the guide surface 112 is inclined to rise in the attaching direction. However, a part of the guide surface 112 may be inclined to rise in the attaching direction. That is, the guide surface 112 may have a region inclined to rise in the attaching direction. In the embodiment, the guide surface 112 may have a region along the horizontal plane. In this case, when the pool hopper 5 is attached to the supporting body 110, by placing the first shaft body 54 on the guide surface 112, at least a part of the weight of the pool hopper 5 can be effectively supported by the guide surface 112. In the embodiment, the guide surface 112 may have a region inclined to descend in the attaching direction. That is, the guide surface 112 may have at least one of a region inclined to rise in the attaching direction, a region along the horizontal plane, and a region inclined to descend in the attaching direction.

In the embodiment, the guide surface 112 may be a flat surface, a curved surface, or a surface obtained by combining a flat surface and a curved surface. In the embodiment, the pool hopper 5 is a support target of the supporting body 110. However, the hopper as the support target is not particularly limited. For example, the weighing hopper 11 may be used as the support target.

In the embodiment, a conveying portion for conveying the articles A to the weighing hopper 11 is not limited to the dispersion feeder 3 and the plurality of radiation feeders 4, and may have other configurations. In the embodiment, the plurality of pool hoppers 5 may be arranged in a matrix.

In the embodiment, a cylindrical body such as a collar or a bearing may be attached to the first shaft body 54 by extrapolation (that is, so that the first shaft body 54 is inserted into the cylindrical body). In this way, it is possible to reduce a frictional force when the first shaft body 54 is moved along the guide surface 112. Even when the inclination angle of the guide surface 112 is larger than 45°, the pool hopper 5 can be attached without requiring much attaching force (force for pushing the pool hopper 5 in the attaching direction, etc.). In this case, the cylindrical body is included in means for reducing the attaching force.

Figure 11:
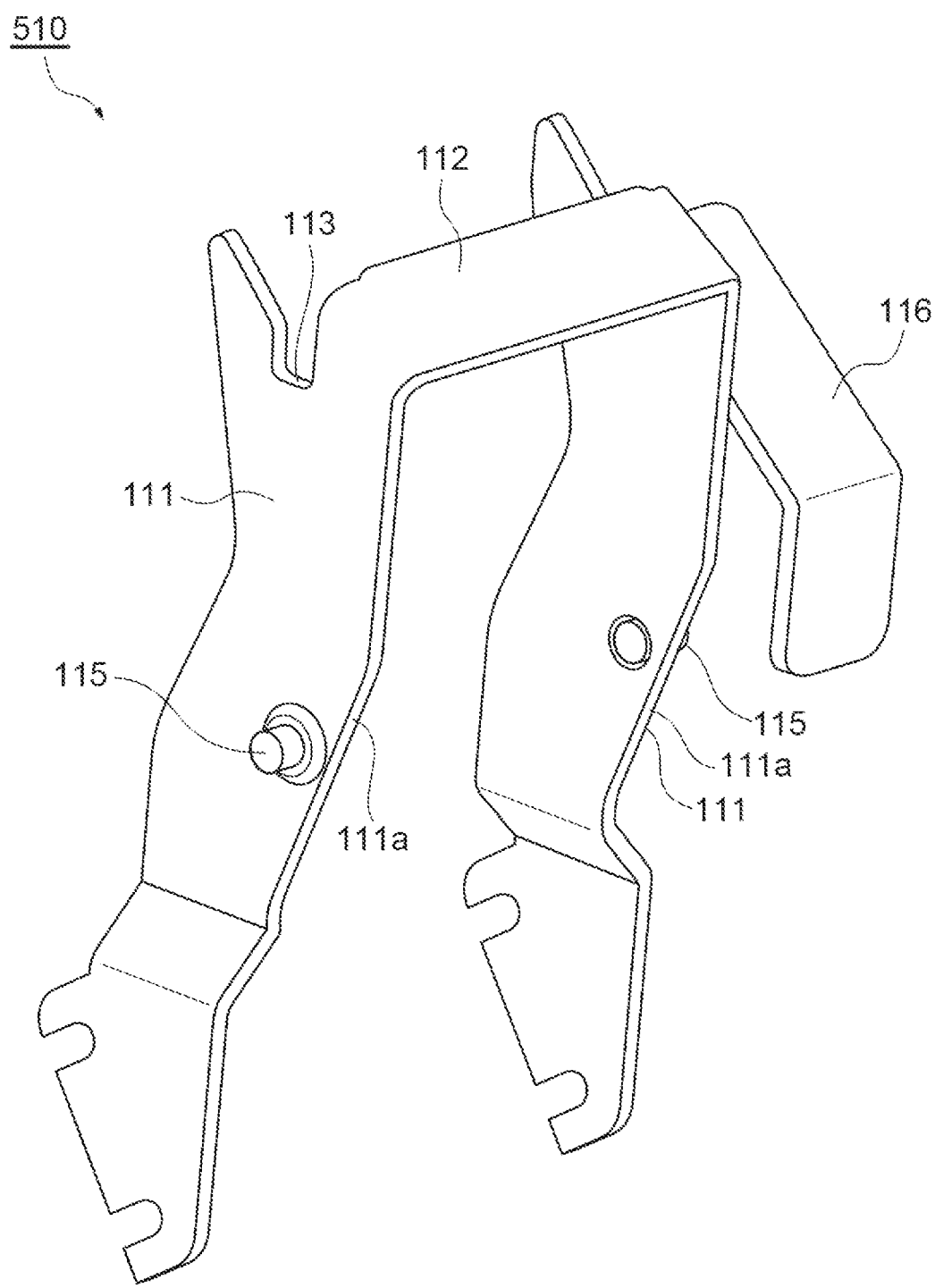
FIG. 11 is a perspective view illustrating a supporting body according to another modification.

In the embodiment, the supporting body 110 has the contact surface 114 (see FIG. 3). However, the invention is not limited thereto. For example, as in a supporting body 510 illustrated in FIG. 11, the contact surface 114 may not be provided. In this case, instead of bringing the first shaft body 54 of the pool hopper 5 into contact with the contact surface 114, the first shaft body 54 of the pool hopper 5 can be brought into contact with a thick portion (side surface 111a on the front side) of the supporting body vertical wall 111. The supporting body 510 not having such a contact surface 144 is advantageous from a viewpoint of cleanability since dirt does not adhere to the back side of the contact surface 144.

Even though the embodiment and the modification have been described above, the present disclosure is not limited to the above-described embodiment and modification. For example, as the material and shape of each configuration, it is possible to adopt not only the above-mentioned material and shape but also various materials and shapes. The present disclosure may be modified without changing the gist described in each claim. The above-described embodiment and modification may be appropriately combined. At least a part of the above-described embodiment and modification may be arbitrarily combined.

REFERENCE SIGNS LIST

5: pool hopper (hopper), 5*a*: gate, 51: main body, 100: article retaining device, 110, 510: supporting body 111: supporting body vertical wall (vertical wall), 112: guide surface, 113: engaging portion, 114: contact surface, A: articles.

The invention claimed is:

1. An article retaining device comprising:
a hopper configured to temporarily retain articles and discharge the articles; and
a supporting body configured to detachably support the hopper,
wherein the hopper has
a main body configured to retain the articles, and
an extending portion that extends along a width direction of the main body,
the supporting body has
an engaging portion that engages with the extending portion, and
a guide surface configured to guide movement of the extending portion to the engaging portion when the hopper is attached, wherein
the hopper has a gate provided at a bottom thereof and allowed to be opened and closed, and
a direction in which the hopper moves when the hopper is attached to the supporting body and which extends along a horizontal direction is set to an attaching direction,
the guide surface is provided to not contact the gate in an open state in a direction along the attaching direction.

2. The article retaining device according to claim 1, wherein
the guide surface has a region inclined to rise in the attaching direction.

3. The article retaining device according to claim 2, wherein an inclination angle of an inclined region on the guide surface is 45° or less.

4. The article retaining device according to claim 1, wherein the guide surface has a region along a horizontal plane.

5. The article retaining device according to claim 1, wherein the engaging portion is a groove provided at a position lower than the guide surface to accommodate the extending portion.

6. The article retaining device according to claim 5, wherein
the groove as the engaging portion is provided to be continuous with an end side of the guide surface in the attaching direction when viewed from a horizontal direction orthogonal to the attaching direction.

7. The article retaining device according to claim 1, wherein
the supporting body has a contact surface provided on a side in a direction opposite to the attaching direction with respect to the guide surface and capable of coming into contact with the extending portion when the hopper is attached.

8. The article retaining device according to claim 7, wherein when viewed from a horizontal direction orthogonal to the attaching direction, the contact surface is provided to be continuous with an end side of the guide surface in the direction opposite to the attaching direction and extends downward from the end side.

9. The article retaining device according to claim 7, wherein an angle at which the guide surface and the contact surface intersect is 90° or more and less than 180°.

10. The article retaining device according to claim 7, wherein the supporting body has a pair of vertical walls arranged to face each other in a width direction of the main body,
the guide surface is provided to bridge the pair of vertical walls in a state where the hopper is attached to the supporting body, and
the contact surface is provided to close between the pair of vertical walls.

11. A supporting body for detachably supporting a hopper having a main body for retaining articles, and an extending portion that extends along a width direction of the main body, the supporting body comprising:
an engaging portion that engages with the extending portion of the hopper; and
a guide surface configured to guide movement of the extending portion to the engaging portion when the hopper is attached, wherein
the hopper has a gate provided at a bottom thereof and allowed to be opened and closed, and
a direction in which the hopper moves when the hopper is attached to the supporting body and which extends along a horizontal direction is set to an attaching direction,
the guide surface is provided to not contact the gate in an open state in a direction along the attaching direction.

* * * * *